United States Patent [19]

Holt

[11] 4,270,057
[45] May 26, 1981

[54] BATTERY ISOLATOR SWITCHES FOR USE IN ROAD VEHICLES

[75] Inventor: William D. Holt, Colne, England

[73] Assignee: Lucas Industries Limited, Birmingham, England

[21] Appl. No.: 95,945

[22] Filed: Nov. 20, 1979

[30] Foreign Application Priority Data

Nov. 25, 1978 [GB] United Kingdom ............... 46080/78

[51] Int. Cl.³ .............................................. H02J 1/00
[52] U.S. Cl. ............................. 307/10 BP; 307/10 R; 320/61
[58] Field of Search ..................... 307/10 BP, 10 R, 9, 307/85, 115, 141; 361/20, 21, 205; 322/28, 99; 320/61, 64, 68, 20, 21, 22, 23, 24, 5, 11

[56] References Cited

U.S. PATENT DOCUMENTS

| | | | |
|---|---|---|---|
| 2,538,581 | 1/1951 | Minch et al. | 307/10 BP |
| 4,156,217 | 5/1979 | Thornley | 335/107 |

Primary Examiner—J. D. Miller
Assistant Examiner—Reinhard J. Eisenzopf
Attorney, Agent, or Firm—Holman & Stern

[57] ABSTRACT

A battery isolator switch has main battery contacts and an auxiliary contact for controlling the supply of excitation current to an alternator. In order to ensure that there is a delay between opening the auxiliary contact and the main contacts when the switch is tripped by a remote contact, there is provided a latching circuit which energizes a relay for opening the auxiliary contact, and a delay circuit for turning on a transistor after a suitable delay, to energize a main tripping winding via another relay.

6 Claims, 2 Drawing Figures

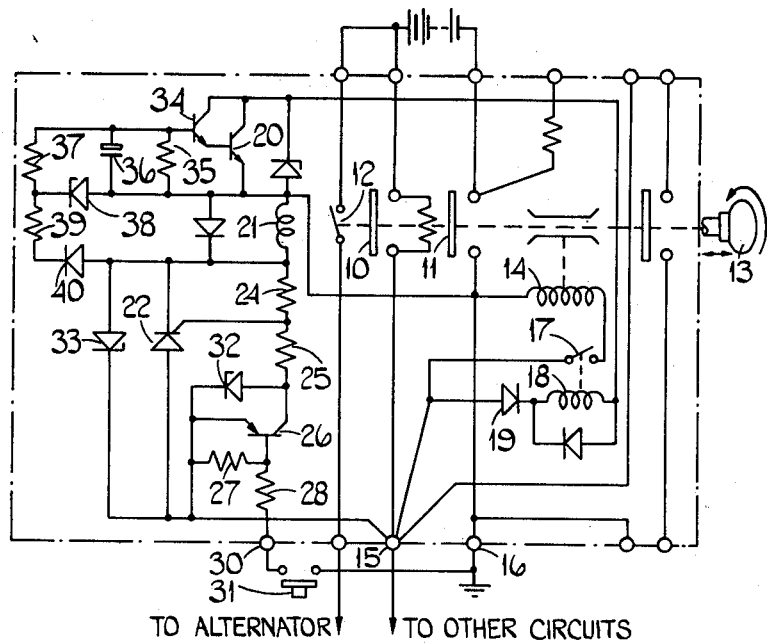

TO ALTERNATOR  TO OTHER CIRCUITS

U.S. Patent     May 26, 1981     4,270,057

FIG.1.

TO ALTERNATOR    TO OTHER CIRCUITS

FIG.2.

TO ALTERNATOR    TO OTHER CIRCUITS

BATTERY ISOLATOR SWITCHES FOR USE IN ROAD VEHICLES

This invention relates to battery isolator switches for use in road vehicle.

A known battery isolator switch is described in British Pat. Application No. 41227/76 which includes battery connection contact means, alternator connection contact means, mechanical means for closing the contact means and electrical release means. To prevent damage to the alternator caused by the surge which may occur if the battery is suddenly disconnected from the alternator with the engine running, the alternator contact means is used to disconnect the alternator field winding and an automatic delay is introduced between opening this alternator contact means and operating the electrical release means.

In the prior art the delay is obtained by using an external delay relay, but the arrangement is such that the external switch used to trigger the electrical release means must be held closed for the duration of the delay. Since the main use of battery isolator switches is in emergency situations—e.g. when the vehicle is involved in an accident and there is a fire risk—it is desirable to ensure that release of the isolator switch can be achieved by a single momentary operation of a release switch.

A battery isolator switch in accordance with the invention comprises battery connection contact means, alternator connection contact means, latching mechanical means for closing said contact means, said mechanical means latching with the contact means in closed position, electrical release means operating on said mechanical means for opening said contact means, a relay winding operable independently of said mechanical means for opening said alternator connection contact means and an electrical control circuit for operating said electrical release means and said relay winding and including a latching circuit operable by momentary closure of a remote contact and providing current to said relay winding and a delay circuit for operating said electrical release means after a predetermined delay.

The latching circuit may include a thyristor in series with the relay winding and a circuit controlled by the remote contact for firing the thyristor. The delay circuit may then simply comprise a resistor—capacitor combination connected in parallel with the relay winding and a transistor amplifier sensitive to the capacitor voltage.

Alternatively the latching circuit may include an additional relay with a self-latching contact arrangement, the relay and the additional relay having their windings in parallel between a supply terminal controlled by the battery connection contact means and the remote contact which is arranged so as, when closed, to provide an earth return connection.

In the accompanying drawings,

FIG. 1 is the electrical circuit diagram of one example of a switch in accordance with the invention and FIG. 2 is the circuit diagram of another embodiment of the invention.

Mechanically the switch is the same in both examples as that described in U.K. Pat. Application No. 41227/76 except that the delay relay 61 used in that construction is separate from the main switch housing. In the present constructions the corresponding relay, which has no delay components specifically associated with it can be enclosed within the switch housing.

Referring firstly to FIG. 1 the switch includes main contacts 10, 11 alternator contacts 12 and a mechanical device 13 (not shown in detail since it forms no part of the present invention) for closing these contacts 10, 11, 12. Electrical contact release means in the form of a winding 14 is also provided which operates as disclosed in Application No. 41227/76, to trip the mechanical latch associated with the device 13 and cause opening of all the contacts of the switch.

The winding 14 is connected between the positive and negative output terminals 15, 16 of the switch in series with a relay contact 17 which is operated by a relay winding 18. One end of the relay winding 18 is connected by a diode 19 to the terminal 15 and its other end is connected to the collector of a transistor 20, the emitter of which is connected to the terminal 16.

A further relay winding 21 is associated with the alternator contact 12 and, when energised, causes the contact 12 to open independently of the mechanical device 13. One end of the winding 21 is connected to the terminal 16 and its other end is connected to the cathode of a thyristor 22, the anode of which is connected to the terminal 15. The gate of the thyristor 22 is connected to the junction of two resistors 24, 25 which are connected in series between the collector of a pnp transistor 26 and the cathode of the thyristor 22. The emitter of the transistor 26 is connected to the terminal 15 and its base is connected to the junction of two resistors 27, 28 which are connected in series between terminal 15 and a further terminal 30. A remote push button switch 31 connects the terminal 30 to the terminal 16. Protective zener diodes 32 and 33 are connected across the collector-emitter of transistor 26 and the anode-cathode of thyristor 22 respectively.

The transistor 20 has its base connected to the emitter of a drive transistor 34 the collector of which is connected to the collector of transistor 20. The base of drive transistor 34 is connected by a resistor 35 and a capacitor 36 in parallel to the terminal 16. The base of transistor 34 is also connected by a resistor 37 to the cathode of a zener diode 38, the anode of which is connected to the terminal 16. The cathode of the zener diode 38 is connected by a resistor 39 and a diode 40 in series to the cathode of the thyristor 22.

In use the mechanical device 13 is used to close the contacts 10, 11, 12 and can also be used to open these contacts when required when the alternator is not running. The switch 31 is normally open so that transistor 26 is biased off by the resistor 27. The capacitor 36 is discharged (the forward breakdown voltage of zener diode 33 being greater than the normal supply voltage) so that transistors 20 and 34 are non-conductive.

When it is required to release the switch in an emergency whilst the engine is running (and the alternator is therefore producing an output), the push button switch 31 is closed momentarily so that transistor 26 turns on. Current flows through resistors 24 and 25 and the relay winding 21, but insufficient current flows to operate this relay. However, the voltage drop across resistor 24 is applied to the gate-cathode of the thyristor 22 which turns on and energises the relay winding 21. Thyristor 22 acts as an electronic latch, that is to say it maintains relay winding 21 energised as long as there is a source of current connected to it.

When thyristor 22 fires, part of the current which it passes flows into the capacitor 36 which charges up and causes the transistors 20, 34 to turn on after a delay. When these transistors turn on relay winding 18 is energised thereby closing contact 17 and energising the winding 14 to release the switch.

Release of the switch causes the power supply to the control circuit to be interrupted so that transistor 26, thyristor 22, and transistors 20 and 34 all turn off. The diode 40 prevents current from the capacitor 36 from passing through the winding 21 during the brief period following switch release in which the capacitor 36 is discharging through the resistor 35.

Referring now to FIG. 2, the components 110, 111, 112, 113, 114, 115, 116, 117, 118, 121, 130 and 131 correspond precisely to the components 10, 11, 12, 13, 14, 15, 16, 17, 18, 21, 30 and 31 of FIG. 1. The latching circuit and the delay circuit are, however, different.

It will be seen that one end of the relay winding 121 is connected to the cathode of a diode 150, the anode of which is connected to the terminal 115 and the other end of relay winding 121 is connected to the terminal 130, which is connected by the normally open remote contact 131 to earth.

Instead of the thyristor 22, a further relay 151 is used for latching purposes. The winding 151a of relay 151 is connected in parallel with the relay winding 121. The common terminal 151b of relay 151 is connected to the terminal 130 and its normally open contact 151d is connected to the earthed terminal 116. Thus when the relay windings 121, 151a are energised by a momentary closure of contact 131, the relay 151 acts to latch the two relays.

The normally closed contact 151c of relay 151 is connected to the anode of a diode 152 the cathode of which is connected to one terminal of a delay capacitor 153, the other terminal of which is connected to the anode of the diode 150. Said one terminal of the capacitor 153 is connected via two resistors 154, 155 in series to the anode of a diode 156, the cathode of which is connected to the terminal 130. A resistor 157 is connected across the capacitor 153 and a zener diode 158 has its anode connected to the junction of the resistors 154, 155 and its cathode connected to the cathode of the diode 150. A further zener diode 159 has its anode connected to said one terminal of the capacitor 153 and its cathode connected to the base of a pnp transistor 160 the emitter of which is connected to the cathode of the diode 150.

The collector of the transistor 160 is connected to one end of the winding 118, the other end of which is connected to the earthed terminal 116.

Thus when the relay 151 is not energised capacitor 153 stands discharged (via resistor 157), but as soon as the relay 151 is energised capacitor 153 starts charging via resistors 154 and 155 until zener diode 159 conducts and turns on transistor 160 thereby energising winding 118, causing closing of contacts 117 to energise the trip winding 114.

I claim:

1. A battery isolator switch comprising battery connection contact means, alternator connection contact means, latching mechanical means for closing said contact means, said mechanical means latching with the contact means in closed position, electrical release means operating on said mechanical means for opening said contact means, a relay winding operable independently of said mechanical means for opening said alternator connection contact means and an electrical control circuit for operating said electrical release means and said relay winding and including a latching circuit operable by momentary closure of a remote contact and providing current to said relay winding and a delay circuit for operating said electrical release means after a predetermined delay.

2. A battery isolator switch as claimed in claim 1 in which said latching circuit includes a thyristor in series with the relay winding and a circuit controlled by the remote contact for firing the thyristor.

3. A battery isolator switch as claimed in claim 2 in which said circuit controlled by the remote contact comprises a transistor connected to the remote contact so as to be turned on when said remote contact is closed and resistor means connecting the transistor to the gate and cathode of the thyristor so as to trigger the thyristor when the transistor is on.

4. A battery isolator switch as claimed in claim 2 or claim 3 in which the delay circuit comprises a resistor-capacitor combination connected in parallel with the relay winding and a transistor amplifier sensitive to the capacitor voltage.

5. A battery isolator switch as claimed in claim 1 in which said latching circuit includes a further relay having a self-latching contact arrangement, said relay and said further relay having their windings in parallel and the contact of the further relay being in parallel with said remote contact.

6. A battery isolator switch as claimed in claim 5 in which said delay circuit includes a resistor-capacitor combination connected to said remote contact and a transistor controlled by the capacitor voltage.

* * * * *